United States Patent [19]

Tajima

[11] 4,170,783

[45] Oct. 9, 1979

[54] SIGNAL PICKUP DEVICE FOR REPRODUCING AN INFORMATION SIGNAL RECORDED ON A TRACK OF A ROTARY RECORDING MEDIUM

[75] Inventor: Osamu Tajima, Ayase, Japan

[73] Assignee: Victor Company of Japan, Ltd., Yokohama, Japan

[21] Appl. No.: 885,579

[22] Filed: Mar. 13, 1978

[30] Foreign Application Priority Data

Mar. 14, 1977 [JP] Japan .................... 52-27714
Mar. 15, 1977 [JP] Japan .................... 52-28262

[51] Int. Cl.² ........................... H04N 5/76
[52] U.S. Cl. ................. 358/128; 179/100.1 B; 179/100.4 R; 274/23 R
[58] Field of Search ............ 358/128; 179/100.1 B, 179/100.3 V, 100.4 M, 100.4 D, 100.4 R; 360/36, 77, 109; 274/23 R, 37; 310/12, 13

[56] References Cited

U.S. PATENT DOCUMENTS

| | | | |
|---|---|---|---|
| 3,381,086 | 4/1968 | DeMoss | 179/100.3 V |
| 3,527,900 | 9/1970 | Muttick | 274/37 |
| 3,872,241 | 3/1975 | Adler | 360/77 |
| 3,973,080 | 8/1976 | Dickopp | 358/128 |
| 3,983,318 | 9/1976 | Miller | 179/100.3 V |
| 3,987,255 | 10/1976 | Kawakami | 179/100.41 M |
| 4,059,277 | 11/1977 | DeStephanis | 358/128 |

*Primary Examiner*—Bernard Konick
*Assistant Examiner*—Alan Faber

[57] ABSTRACT

A signal pickup device is used in an apparatus for reproducing an information signal recorded in a track on a horizontal surface of a rotary recording medium. The signal pickup device comprises a reproducing stylus for tracing the track to reproduce the information signal. A cantilever arm is supported by way of a damper to be rotatable about substantially the proximal end thereof. The arm is movable in an axial direction thereof. The reproducing stylus is mounted at a free distal end of the arm. A permanent magnet member is fixed to the proximal end of the cantilever arm with the magnetic poles on the opposite lateral faces extending in the axial direction of said cantilever. A tracking control coil is mounted with a pair of winding surfaces extending substantially in a vertical direction, to confront the faces of the magnetic poles. A tracking control signal current is generated in response to a tracking error and supplied to the tracking control coil. The tracking control signal current flows in opposite directions through the pair of vertical winding surfaces. The permanent magnet member rotates about a hypothetically vertical axis for rotating the cantilever, due to a mutual reaction between the magnetic field and the tracking control signal current. Thus, the reproducing stylus is displaced so as to trace the track in a proper tracing position.

10 Claims, 18 Drawing Figures

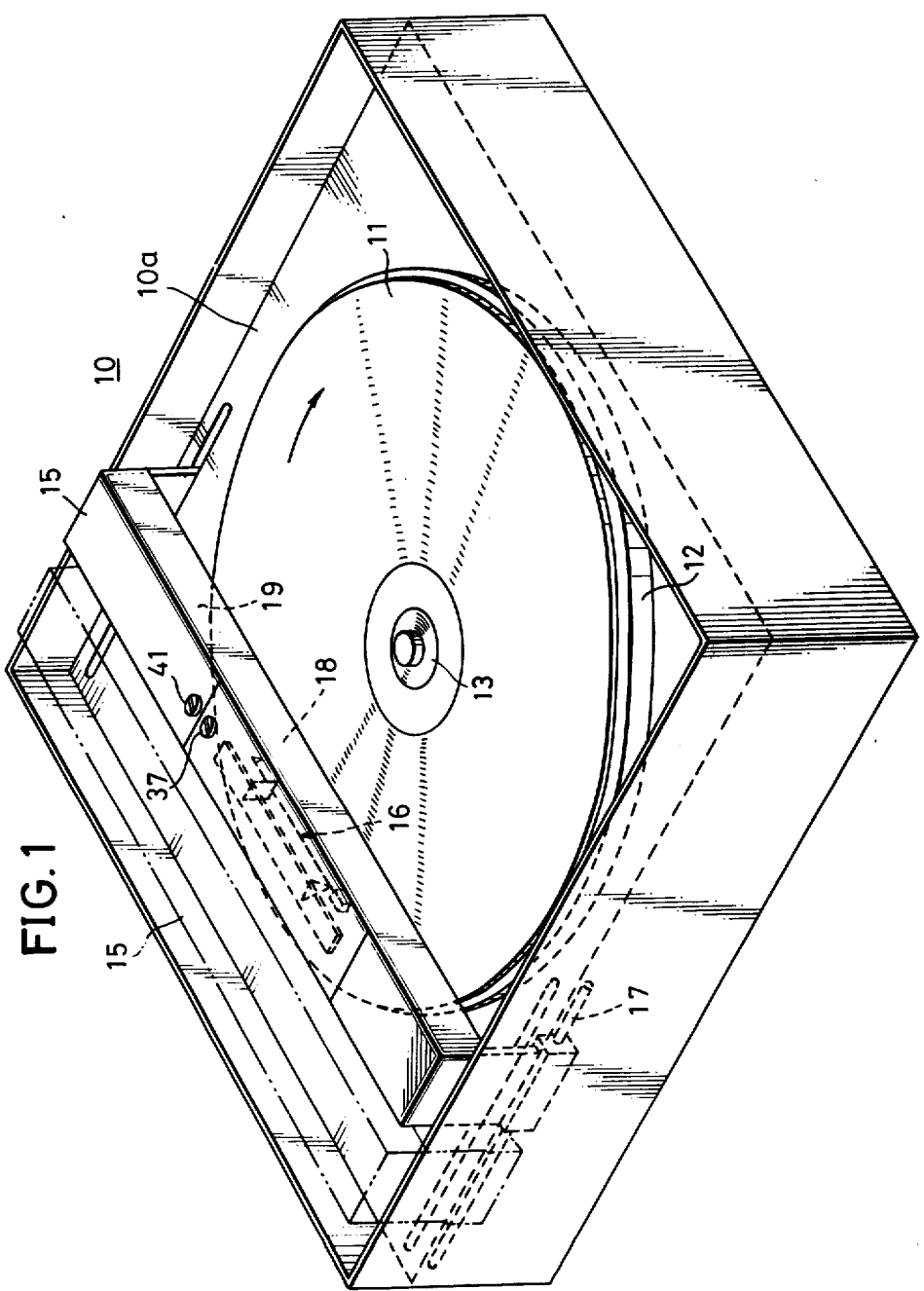

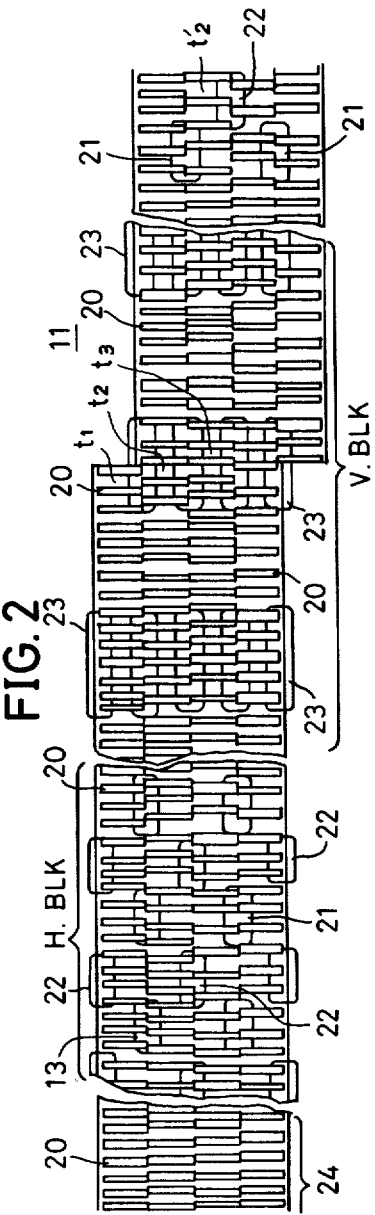
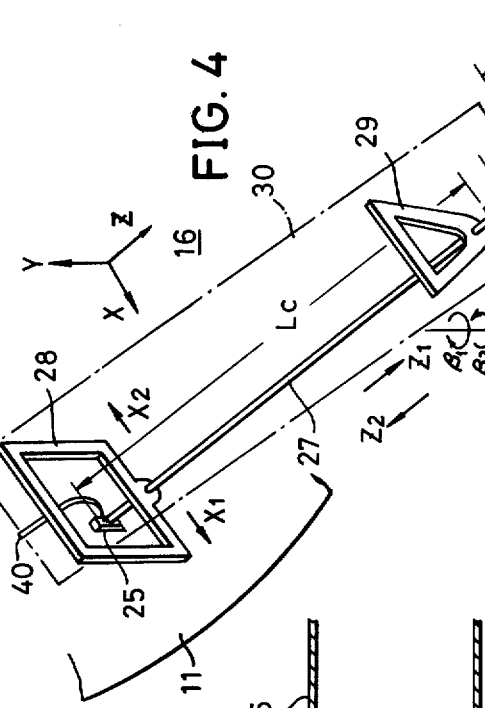
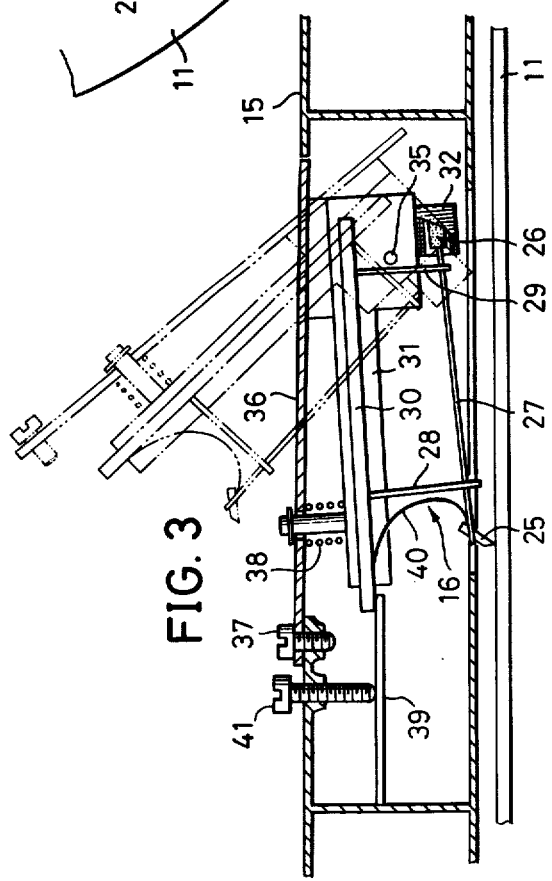

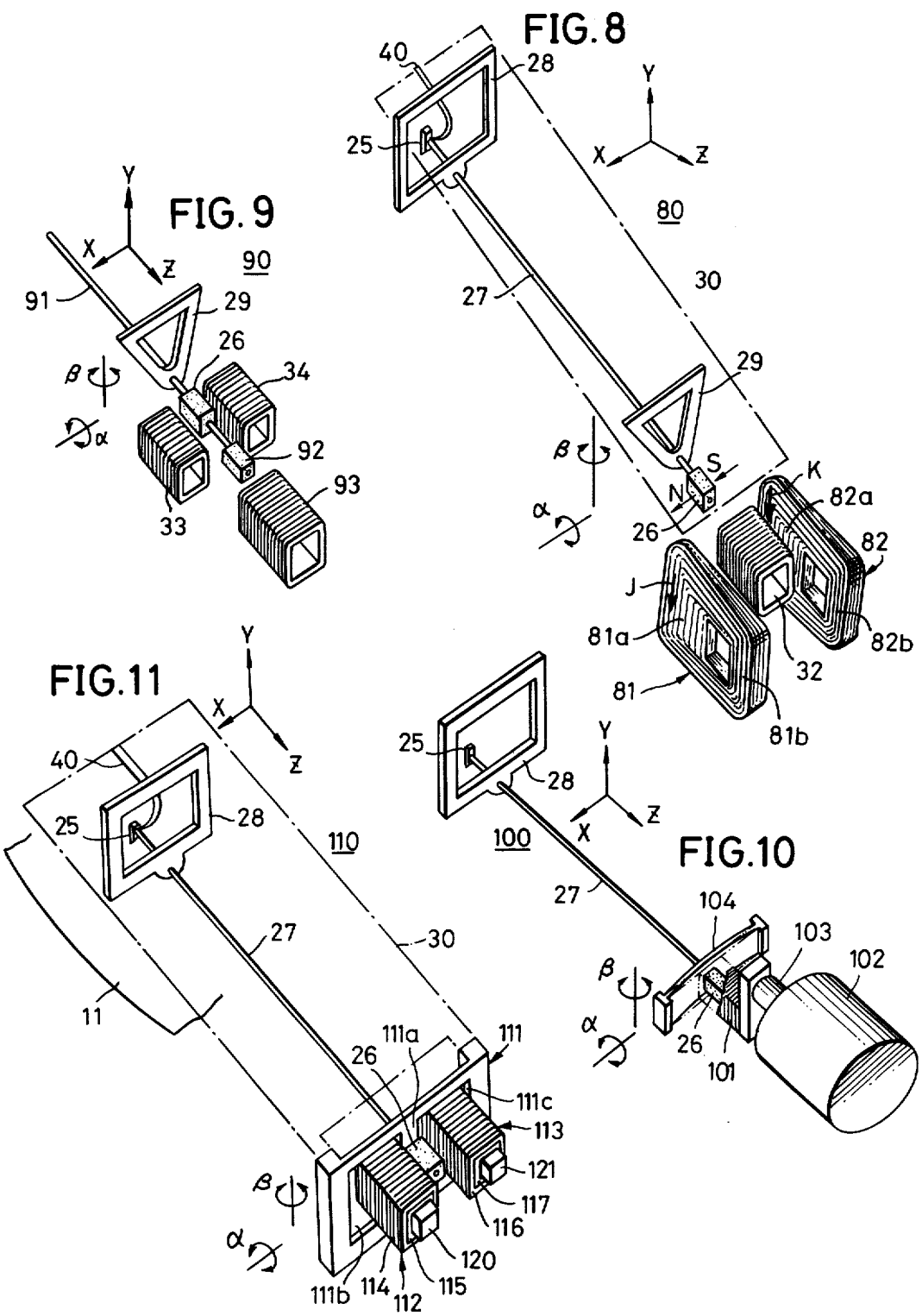

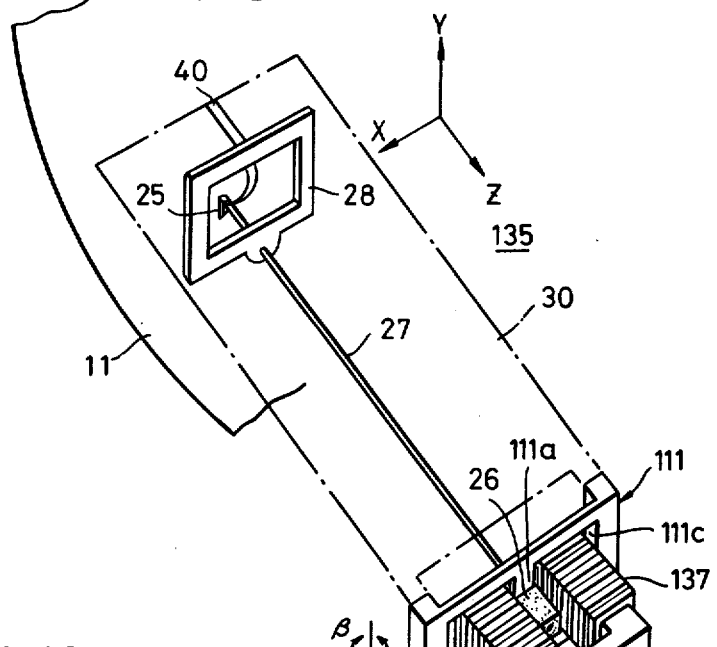
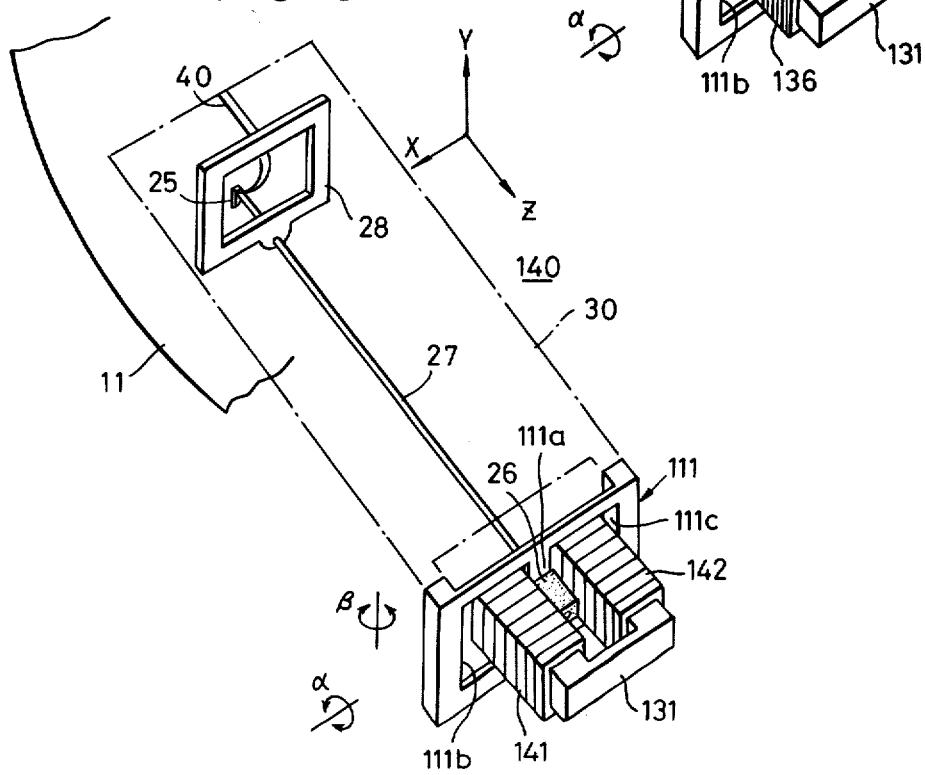

SIGNAL PICKUP DEVICE FOR REPRODUCING AN INFORMATION SIGNAL RECORDED ON A TRACK OF A ROTARY RECORDING MEDIUM

BACKGROUND OF THE INVENTION

The present invention relates to signal pickup devices for reproducing recorded signals from rotary recording mediums. More particularly, the invention relates to a video signal pickup device capable of tracking control. The pickup is used primarily in an apparatus for reproducing video signals from a rotary disc on which the signal has been recorded on either a spiral track or concentric circular tracks. The tracking control causes the reproducing stylus to accurately trace over the recorded track. Further, there is a jitter compensation in a manner such that a reproducing stylus moves along the longitudinal direction of the track.

Heretofore, there have been apparatus of the designed type. For example, a rotary disc (referred to as "disc" hereinafter) has a video signal recorded on a spiral track as variations in the geometrical shapes corresponding to an information content. A reproducing transducer, that is, a signal pickup device is caused to trace over the spiral track and reproduce the recorded video signal. In a pickup device of this character, it is necessary for the signal pickup device to trace the track accurately. For this reason, it is necessary to provide means for detecting any tracking deviation of the signal pickup device relative to the track. In response to this error, the position of the signal pickup device is controlled so that it will trace accurately over the track thereby accomplishing a tracking control.

The present applicant has previously described in a commonly assigned United States Patent Application Ser. No. 841,531, filed Oct. 11, 1977, by Kazuo Tatsuguchi and Hisao Kinjo, and entitled "Reproducing transducer capable of tracking control", a signal pickup device in which a cantilever or a conductor fixed thereto is disposed within a magnetic field created by a permanent magnet. The pickup is supplied with the current of a tracking control signal. Responsive thereto, the cantilever undergoes a displacement in response to the direction and magnitude of the control current to cause a reproducing stylus to trace at a correct position along the recording track on the recording medium.

This signal pickup device, however, is accompanied by various problems due to its construction, the most serious of which are recited below.

1. The length of the cantilever arm or the conductor is short in the magnetic field due to the permanent magnet. Therefore, a sufficient displacing force cannot be produced for accomplishing a tracking control.

2. The cantilever position easily varies within the magnetic field because of disc surface oscillation and the like. The magnetic flux density (or magnetic induction) varies at the position of the cantilever thereby giving rise to a change in the tracking gain characteristic. As a result, an optimum control cannot be achieved, and accurate and positive tracking control can no longer be accomplished.

3. Since the lead wires are signal detection and the conductor for tracking control are in close proximity to each other, a mutual induction takes place, whereby the signal reproducing characteristic and tracking accuracy deteriorate.

SUMMARY OF THE INVENTION

Accordingly, it is a general object of the present invention to provide a novel and useful signal pickup device for reproducing rotary recording mediums, which device overcomes the above described problems.

Another and specific object of the invention is to provide a signal pickup device in which a permanent magnet member is fixed onto the proximal root part of a rotatably supported cantilever arm having a reproducing stylus at its distal free end. The cantilever arm is subjected to a torque when a current is passed through a coil in the vicinity of the magnet member. The torque provides for tracking control over the reproducing stylus.

Still another object of the invention is to provide a signal pickup device in which coils are provided for jitter compensation. The coils are on opposite sides of a permanent magnet member, fixed on a cantilever arm for supporting a pickup stylus signal current responsive to any jitter error is passed through these coils to impart a displacing force upon the cantilever. The displacing force is in an axial direction, acting on the permanent magnet member, thereby displacing the reproducing stylus in the track direction, whereby jitter compensation is accomplished.

A further object of the invention is to provide a signal pickup device in which jitter compensation coils are disposed in very close proximity to a permanent magnet member on a pickup arm, thereby to achieve jitter compensation with a high gain.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 1 is a general perspective view of one example of an apparatus for reproducing rotary recording mediums, using the inventive signal pickup device;

FIG. 2 is a fragmentary, enlarged plan view showing one embodiment of a track pattern (according to the invention) on a rotary recording medium;

FIG. 3 is a side view, with parts cut away, showing a first embodiment of a signal pickup device, according to the invention;

FIG. 4 is an exploded perspective view of part of the signal pickup device shown in FIG. 3;

FIG. 8 is an exploded perspective view showing an essential part of a second embodiment of the signal pickup device, according to the invention;

FIG. 9 is an exploded perspective view part of a third embodiment of the signal pickup device, according to the invention;

FIG. 10 is a perspective view of part of a fourth embodiment of the signal pickup device, according to the invention;

FIG. 11 is a perspective view showing the general construction of a fifth embodiment of the signal pickup device, according to the invention;

FIG. 17 is a general perspective view of part of a seventh embodiment of the signal pickup device of the invention; and FIG. 18 is a general perspective view of part of an eighth embodiment of the signal pickup device of the invention.

DETAILED DESCRIPTION

Figure 5:
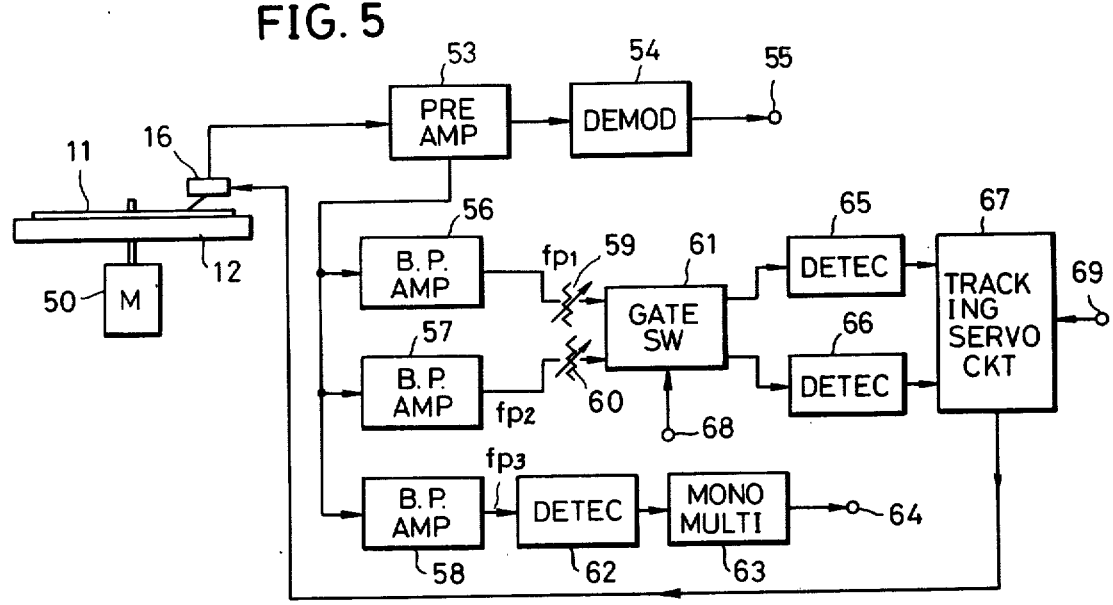
FIG. 5 is a block diagram of one example of a tracking servo circuit.

FIG. 1 shows the general features of the exterior of a reproducing apparatus 10 using the inventive signal pickup device for reproducing a rotary recording medium. In this apparatus 10, a rotary disc 11, is a rotary recording medium having a video signal recorded thereon. The disc 11 is set on and clamped to a turntable unitarily with the turntable 12 at a rotational speed of 900 rpm. A video signal of two frames (that is, four fields) is recorded on each revolution, with spiral tracks of pits formed on the disc 11 responsive to the information content of the signal.

One part of this track is shown in an enlarged scale in FIG. 2. Track turns of the single continuous spiral track, corresponding to each revolution of the disc 11, are designated as $t_1$, $t_2$, $t_3$ .... Each track turn is constituted by the formation of pits 20 of the main information signal along the track path. With respect to one track turn $t_1$, a period H is shown at a position (H.BLK) corresponding to the horizontal blanking period. Pits 21 of the first pilot signal fp1 are formed on one lateral side of the track as viewed in the track path direction (for example, on the right hand side in the direction of rotation). Pits 22 of the second pilot signal fp2 are formed on the other side (left hand side) of the track. With respect to the adjacent track $t_2$, the pits 22 of the second pilot signal fp2 are formed on one side (right hand side) of the track as viewed in the track path direction. These pits are formed at a position corresponding to the horizontal blanking period every period H. On the other side (left hand side), the pits 21 of the first pilot signal fp1 are formed. Thus, the positions at which the pits 21 and the pits 22 of the first and second pilot signals fp1 and fp2 are formed are alternatively reversed in the disc radial direction.

In addition, pits 23 of the third pilot signal fp3 are formed in the position (V.BLK) corresponding to the vertical blanking period. This blanking period coincides with the part of the track turn where the track designation numbers change.

In the present enbodiment of the invention, the pilot signal pits 21 and 22 are formed at only the position H.BLK within one period H. These pits are not formed at other parts 24, but they could also be formed in these parts 24.

Referring again to FIG. 1, a signal pickup device 16 is mounted at a re-entrant cylindrical cavity resonator 18 within a carrier 15. The pickup is connected to a central conductor (not shown) of the resonator. The central conductor is electro-magnetically connected to a high frequency oscillator 19 for producing a frequency of 1 GHz, for example. This organization is well known. The carrier 15 is disposed horizontally above the turntable 12, and is guided at its ends by a pair of parallel horizontal guide bars 17 (only one shown) which are provided below a base plate 10a. This carrier 15 is driven by mechanism (not shown) which moves continuously in horizontal translation at a speed equal to the distance of one track pitch per revolution of the turntable 12. The carrier movement is in synchronism with the rotation of the turntable. As a result of this movement of the carrier 15, a stylus of the reproducing transducer 16 travels radially ocross the disc 11 and traces the spiral track of the disc 11 during rotation.

A first embodiment of the inventive signal pickup device 16 will now be described with reference to FIGS. 3 and 4. This pickup device 16 has a relatively long cantilever arm 27 (of a length Lc) with a reproducing stylus 25 at its distal free end and A permanent magnet member 26 at its proximal root end . This cantilever arm is supported near its free end by a damper 28 of a Rahmen or rigid frame structure (of rectangular shape). Arm 27 is held near its root part by a damper 29 having a truss structure (of triangular shape). Both of these dampers are fixed to the lower surface of a substantially horizontal support plate 30. In this connection, the present applicant has previously described this construction in, through U.S. Patent Application Ser. No. 786,787, filed Apr. 12, 1977, entitled "Signal pickup apparatus for reproducing a recording disc".

The cantilever arm is held at a point on the damper 28 so that it can undergo a displacement in the arrow direction X (the disc radial direction), the arrow direction Y (vertical direction), and the arrow direction Z (cantilever radial direction). Moreover, the spring constants with respect to displacements in these directions are set at desired values. Furthermore, the cantilever holding point of the damper 29 is its vertex. This point undergoes almost no displacement in the arrow directions X, but it Y and permits translational displacement in the arrow direction Z and rotations $\alpha$ and $\beta$ respectively about the X and Y axes. At the same time, the spring constants are set as desired with respect to these displacements and rotations.

The support plate 30 is fitted in and held by a holding structure 31. On the lower surface of plate 30 are fixed a coil 32 for tracking and a pair of coils 33 and 34 for jitter compensation plate 30 are disposed on opposite sides of the tracking coil 32. The above mentioned permanent magnet member 26 is fitted within the tracking coil with gaps therebetween.

The lid 36 is hinged on the hinge shaft 35, and is fastened and closed by a screw 37. When the lid 36 is closed, the holding structure 31 is rotatably supported on the shaft 35 and is urged by a coil spring 38 to rotate counterclockwise. Furthermore, the forward end of the support plate 30 is pressed against the free end of a central conductor 39 of the coaxial resonator. The reproducing stylus 25 contacts the rotary disc 11. The electrode of the reproducing stylus 25 is electrically connected through a metal ribbon 40 to the central conductor 39. As the reproducing stylus 25 traces along a track on the disc 11, the video signal recorded thereon by variation of pits is reproduced as variation in the electrostatic capacitance between the surface of the disc 11 and the electrode of the reproducing stylus 25.

When an adjusting screw 41 is turned, the central conductor 39 is deflected. The height position of the support plate 30 is adjusted by the compressed coil spring 38. The pressure of the reproducing stylus 25 is adjusted against the rotary disc 11. The signal pickup device can easily be replaced with the lid 36 opened, as indicated by the two-dot chain lines.

The permanent magnet member 26 has a rectangular parallelepiped shape, and is magnetized so that its left side is the N pole and its right side is the S pole.

The tracking coil 32 is wound in a rectangular shape and secured to the lower surface of the holding structure 31. The coil 32 is such that the permanent magnet member 26 fits thereinto with a gap therebetween. The axial direction of the coil 32 coincides with the arrow Z direction. Furthermore, the jitter compensation coils 33 and 34, of rectangular cross-section, are mounted on opposite sides of and adjacent to the tracking coil 32 with their axes aligned in the arrow Z direction. The winding directions and the series connection of these jitter compensation coils 33 and 34 are such that current flows respectively through these coils 33 and 34 in the arrow directions E and F, that is, in opposite directions. In addition, the length $l_1$ of the coils 32, 32, and 34 is such that the quantity of the magnetic flux produced by the permanent magnet member 26 and crossing the coil structures undergoes almost no variation even if the permanent magnet member 26 is displaced in the arrow direction X and the arrow direction Z.

Next to be described is the displacement and rotation of the cantilever arm 27, supported by the two dampers 28 and 29.

Because of the characteristics of the dampers 28 and 29, the cantilever arm 27 can be displaced in a straight line in the direction of the axis Z. At the same time, the cantilever arm 27 is supported so that it can rotate in directions $\alpha$ and $\beta$, with respect to the pivot point of the damper 29. Furthermore, in the signal pickup device 16, the displacement in the arrow direction Z, the rotation in direction $\alpha$, and the rotation in direction $\beta$ produce resonant frequencies in the cantilever arm 27 which can be determined from the following equations:

$$\omega_z \approx \sqrt{\frac{K_{28z} + K_{29z}}{M + m}} \text{ (rad/sec)} \quad (1)$$

$$\omega_\alpha \approx \sqrt{\frac{(K_Y L_1^2 + K_\alpha)}{(\frac{ML^2}{3} + ml^2)}} \quad (2)$$

$$\omega_\beta \approx \sqrt{\frac{(K_X L_1^2 + K_\beta)}{(\frac{ML^2}{3} + ml^2)}} \quad (3)$$

where:

$\omega_Z$ is the resonant frequency of displacement in the Z direction;

$\omega_\alpha$ is the resonant frequency of rotation about the X axis with the damper 29 as the pivot point;

$\omega_\beta$ is the resonant frequency of rotation about the Y axis with the damper 29 as the pivot point;

$K_{28z}$ is the spring constant in the Z direction of the damper 28;

$K_{29z}$ is the spring constant in the Z direction of the damper 29;

$K_Y$ is the spring constant in the Y direction of the damper 28;

$K_X$ is the spring constant in the X direction of the damper 28;

$K_\alpha$ is the spring constant about the X axis of the damper 29;

$K_\beta$ is the spring constant about the Y axis of the damper 29;

M is the mass of the cantilever 27;

m is the mass of the permanent magnet member 26;

L is the length of the cantilever 27;

l is the distance between the center of gravity of the magnet member 26 and the pivot point of the cantilever 27; and $L_1$ is the distance between the damper 28 and the pivot point of the cantilever 27.

Figure 7:
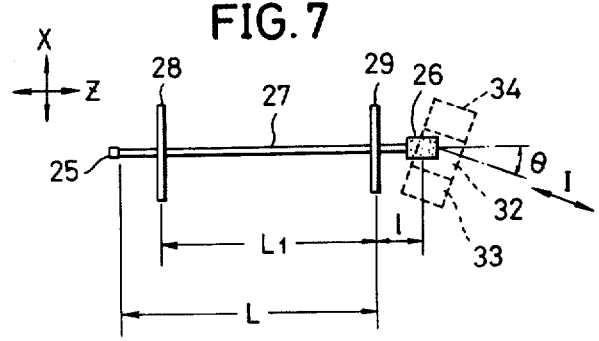
FIG. 7 is a schematic diagram indicating the state of the coils of the pickup device illustrated in FIG. 3 in which an assembly error exists.

The distances L, l, and $L_1$ are indicated in FIG. 7.

Of the above enumerated factors, almost all are variables which can be selected at will. Therefore, the three resonant frequencies which determine the dynamic performance of the cantilever arm 27 can be set at desired values, such that resonance does not occur during actual operation. Then, since the resonant frequencies $\omega_z$, $\omega_\alpha$, and $\omega_\beta$ are set at different values, in the control in all directions (particularly translation in the Z direction and rotation in the $\beta$ direction), they have a mutual effect. Particularly, the resonant frequencies cooperate to prevent an increase of jitter error at the time of tracking control and an increase of tracking error at the time of jitter compensation.

The follow-up characteristic of the reproducing stylus 25, with respect to surface oscillations of the disc, is related to the above Eq.(2). The follow-up characteristic, with respect to the signal track, is related to the above Eq.(3). Furthermore, there is a deterioration in the follow-up characteristic due to the addition of the permanent magnet member 26. This deterioration occurs because the inertia of the cantilever arm 27 becomes $$(\frac{ML^2}{3} + ml^2)$$

from $ML^2/3$. The signal pickup device 16 can be designed to obtain the relationships $m \leq 10M$ and $L \geq 10l$. For this reason, the above mentioned deterioration of the follow-up characteristic can be held below 10 percent. Moreover, there is a leeway or margin of 20 dB or more in the surface oscillation follow-up characteristic. The tracking characteristic also has a leeway of 20 dB or more, as described hereinafter. Accordingly, some degree of the deterioration of follow-up characteristic does not give rise to problems, in actual practice.

The signal pickup device of the above described construction, according to the invention, operates as follows.

The disc 11 rests on the turntable 12 and rotates together therewith at a rotational speed of 900 rpm., being driven by a motor 50. As the disc 11 rotates with oscillation of its surface, the cantilever arm 27 rotates in the $\alpha$ direction. The resulting tracking is accompanied by a deformation of the damper 28 as the reproducing stylus 25 traces a path on the disc 11. A reproduced signal is picked up by the reproducing stylus 25 as a minute variation of electrostatic capacitance from the disc 11. The signal is supplied to a preamplifier 53 having a resonant circuit. The resonant frequency varies in response to this variation in electrostatic capacitance and is formed into a signal of a desired level. The resulting output of the preamplifier 53 is demodulated into the original information signal by a demodulator 54 and is sent out as an output through an output terminal 55.

The output signal of the preamplifier 53 is supplied respectively to amplifiers 56, 57, and 58. Here, each of the amplifiers 56 and 57 is a kind of band-pass amplifier. The amplifier 56 is designed to have a steep passing frequency characteristic at only the frequency fp1. The amplifier 57 is designed to have a steep passing frequency characteristic at only the frequency fp2. A first pilot signal of frequency fp1 and a second pilot signal of frequency fp2 is obtained separately from the amplifiers 56 and 57, and respectively pass through level adjustors 59 and 60, where their levels are adjusted. The resulting signals are then supplied to a gate switching circuit 61.

The amplifier 58 is a kind of band-pass amplifier which is designed to have a steep passing frequency characteristic at only the frequency fp3, for causing a third pilot signal of the frequency fp3 to pass therethrough. The third pilot signal, obtained from the amplifier 53, is supplied to a detecting circuit 62. The resulting output signal is supplied to operate a monostable multivibrator 63. The monostable multivibrator 63 is provided to avoid response to noise components. The output signal thereof is derived from an output terminal 64. In a normal reproducing mode, the output signal from the terminal 64 is applied to trigger a flip-flop circuit (not shown). The output signal of the flip-flop circuit is applied, through an input terminal 68, to switch a gate switching circuit 61.

The gate switching circuit 61 switches the pilot signal fp1 and fp2 on every revolution period of the disc 50, in response to the switching pulse supplied through the terminal 68. The disc rotational speed in the present embodiment of the invention is 900 rpm. Therefore, two frames of the video signal are recorded for each revolution of the disc 11. As a result, a switching pulse undergoes an inversion of polarity every two frames (1/15 second). The gate switching circuit 61 supplies the signals fp1 and fp2, respectively, to detecting circuit 65 and 66.

The detecting circuits 65 and 66 detect the envelopes of their respective input reference signals and convert the envelopes into DC voltages. These voltages are then supplied to the input terminals of differential amplifiers (not shown) within a tracking servo circuit 67. This tracking servo circuit 67 compares the output signals of the two detecting circuits 65 and 66, which outputs vary in response to the reproduced levels of the signals fp1 and fp2. This generates an output tracking error signal which indicates the tracking error direction and the error quantity. This error signal is further amplified to a specific level by known circuitry. Then, it is applied to the coil 32. At the time of special modes of reproduction (such as still reproduction or slow-motion reproduction), a kick-back pulse is formed from the signal from the terminal 64 and applied through the terminal 69 to the tracking servo circuit 67.

When the tracing position of the reproducing stylus 25 deviates from the proper tracing track toward the side of an adjacent track, the level of one of the reproduced pilot signals fp1 and fp2 becomes higher than the level of the other pilot signal. There is a difference between the levels of the output signals of the detection circuit 65 and 66. The tracking servo circuit 67 produces a control signal current in accordance with the level difference between the output signals of the detection circuits 65 and 66.

When the tracking control signal flows in the arrow direction G through the coil 32, opposite-direction forces are generated in the cantilever arm along the axial direction. These forces act respectively on the N-pole side and the S-pole side of the magnet member 26. According to Fleming's left-hand rule, there is a reaction to the forces generated at the side wall parts of the coil 32. As a result of these two forces, there are reactions which act as a couple on the magnet member 26. As a result, a torque is produced in the $\beta_1$ direction about an imaginary vertical axis passing through the center of gravity. As a result of this torque, the cantilever 27 rotates in the $\beta_1$ direction about the point of intersection between the vertical axis and the damper 29, accompanied by a deformation of the damper 28. The reproducing stylus 25 is displaced in the arrow direction $X_2$ in FIG. 4 (i.e., across the disc in a radial direction toward the outside periphery).

Conversely, when the control signal current flows in the arrow direction H through the coil 32, a torque is produced in the $\beta_2$ direction about the above mentioned imaginary axis through the permanent magnet member 26. The cantilever arm 27 rotates in the $\beta_2$ direction about the point of this axis and juncture with the damper 29. The reproducing stylus 25 is displaced in the arrow direction $X_1$ (toward the disc center). As a result, the reproducing stylus is displaced in a direction perpendicular to the track direction in response to the magnitude and direction of the tracking control current. Thus, a tracking control is accomplished so that the reproducing stylus traces accurately and positively along the track. Furthermore, there are a great number of winding turns of the coil 32. The rotational torque becomes large on the permanent magnet member 26. The tracking control operation is carried out stably with almost no effect due to external disturbances.

The demodulated video signal from the aforementioned demodulator 54 is passed through a terminal 70 (FIG. 6) and applied to a horizontal synchronizing signal separation circuit 71. There, the horizontal synchronizing signal is separated. This output horizontal synchronizing signal is supplied to a comparison circuit 72, where it is frequency compared with a pilot signal of 15.75 KHz from a reference signal oscillator 73. If jitter is being produced, a frequency signal is produced responsive to the degree of jitter, as output from the comparison circuit 72. This output signal is converted into a voltage by a frequency-voltage conversion circuit 74. It is further amplified by a power amplification circuit 75. The resulting jitter compensation current is led out through an output terminal 76, to be supplied to the coils 33 and 34.

When currents flow in the arrow directions E and F through the coils 33 and 34, a force acting in the direction toward the reproducing stylus is induced in the vertical winding parts of the coils 33 and 34 and on their sides in the vicinity of the magnet member 26. There is a reactive force acting on the permanent magnet member 26 in the direction which separates the reproducing stylus 25. Consequently, the cantilever arm 27 is displaced in its axial direction, which displacement is accomplished by displacement of the two dampers 28 and 29. The reproducing stylus 25 is displaced in the arrow direction $Z_1$ along the track direction. Conversely, when a current flows through the coils 33 and 34 in the direction opposite to the arrows E, F a force toward the reproducing stylus 25 acts on the permanent magnet member 26. This is reverse to the direction of current flow in the above described case, whereby the reproducing stylus 25 undergoes a displacement in the arrow direction $Z_2$.

Accordingly, the reproducing stylus 25 undergoes displacement in the information track direction (i.e., the arrow direction $Z_1$ or the arrow direction $Z_2$) in response to the magnitude and direction of control current for jitter compensation. Jitter compensation is thus accomplished. This jitter compensation operation can be stably carried out without any effect due to external disturbances, by using coils 33 and 34 of greater number of winding turns. In this connection, the above mentioned force acts directly on the cantilever arm 27 without being transmitted through the dampers or other parts. Therefore, the jitter compensation can be carried out accurately and positively.

There is a large driving force for carrying out the above described tracking control operation and jitter compensation control operation. For this reason, the length Lc of the cantilever arm 27 can be made relatively long, and its moment of inertia can be made relatively large. As a result, dust, scratches, and other disturbances on the disc 11 do not easily cause the reproducing stylus 25 to bounce or skip. At the same time, there is only a small degree of variation of the angle of contact between the reproducing stylus 25 and the disc 11 due to oscillations of the disc surface. Even when there is disc surface oscillation, the abrasive wear of the stylus 25 can be suppressed, and, at the same time, a good signal reproduction is achieved.

Furthermore, since the above mentioned driving force can be made great, the viscosity constants and the elasticity constants can be made large with respect to straight line displacement in the Z direction and rotation in the $\beta$ direction of the dampers 28 and 29 which support the contilever arm 27. As a result, the effect of external disturbances on the tracking control operation and on the jitter compensation operation can be almost completely eliminated. Moreover, because the elasticity constants of the dampers 28 and 29 are set at high values, the frequency characteristic of the control operation can be improved.

Still another advantageous feature of this pickup device is that, since the numbers of winding turns of the coils 32, 33, and 34 are made large, their impedances become high. A low-impedance amplifier can be used for amplifying the control current, and resonance of the cantilever arm 27 can be damped.

A further advantage of this pickup device is that the cantilever 27 is supported at points near its two ends by two dampers 28 and 29 of frame type. Therefore the cantilever can be so aligned that its axis coincides accurately with the tangential direction of the track turn at the point where the reproducing stylus 25 is tracing the track. Therefore, the tracking error produced pulsively at the time of jitter compensation operation is of a negligibly small order.

Next to be described is the mutual effect and action where the tracking control operation and jitter compensation operation are simultaneously carried out. That is, the case where the permanent magnet member 26 undergoes a $\beta$ direction rotation together with a straight-line displacement in the Z direction. In this case, if the magnet member 26 is assumed to rotate in the $\beta$ direction, currents of the same direction flow through the coils 33 and 34. Then since the coils 33 and 34 are connected in series, the control signal currents flow in mutually opposite directions. These currents cancel each other, and the jitter compensation control currents do not vary in the coils 33 and 34. In other words, when the magnet member 26 is displaced in its rotating state along the axial direction, the difference counterelectromotive force generated in the coils 33 and 34 are neutralized. The driving force acts as equal reaction forces on the magnet member 26, due to the two coils 33 and 34. Therefore, the coils 33 cause an accurate displacement of the magnet member 26 in the axial direction, without being affected by the rotational displacement in the $\beta$ direction.

Furthermore, the currents are produced in the coil 32 conversely, because of the electromagnetic induction principle. These currents occur when there is a displacement in the axial direction of the magnet member 26. These currents are of mutually opposite direction and nullify each other. For this reason, the displacement of the magnet member in the axial direction has no effect on the rotation due to the coil 32.

Moreover, the mutual inductions of the coil 32 and the pair of coils 33 and 34 also cancel each other for the same reason as described above, and cause no problem whatsoever.

In addition, as indicated schematically in FIG. 7, if the axes of the coils 33 and 34 are accidentally inclined by a minute angle $\theta$ relative to the axis of the cantilever arm 27, for any reason such as an assembly error, a force in the arrow directional I acts on the magnet member 26 at the time of jitter compensation. However, since the spring constant (in the X direction) of the damper 29 is very large, and, since the value l/L is small, the movement of the cantilever arm 27 in the X direction is limited, and almost no tracking error arises.

Furthermore, if the coil structure 32 is inclined by a minute angle $\theta$, the tracking error can be held to a very small value by making the resonant frequency $\omega_z$ less than the resonant frequency $\omega_\beta$.

Next, a second embodiment of the pickup device according to the invention will be described with reference to FIG. 8. Those parts which are the same as corresponding parts in FIG. 4 are designated by like reference numerals. Description of such parts will not be repeated.

This signal pickup device 80 has two coils 81 and 82 for jitter compensation. The coils have flat shapes and are disposed in Y-Z planes with their flat parts 81a and 82a in intimate contact with the opposite side faces of the coil 32. The magnetic flux lines of the magnet member 26 intersect these flat parts 81a and 82a along a wide planar area. Furthermore, the winding directions and for connections of these coils 81 and 82 are so selected that currents flow therethrough, for example, in the arrow directions J and K.

In the signal pickup device, a tracking control is accomplished similar to the control in the preceding embodiment, by the cooperation between the coil 32 and the magnet member 26. When current for jitter compensation is passed through the coils 81 and 82, a force in the arrow direction Z acts on the magnet member 26. This force is a reaction to the force produced in the flat parts 81a and 82a as a result of the cooperation between the electromagnetic coils 81 and 82 and the magnet member 26. The reproducing stylus 25 undergoes a displacement in the track direction. Jitter compensation is achieved similar to the compensation in the first embodiment of the invention.

In the described pickup device, the magnetic flux does not intersect the parts 81b and 82b of the coils 81 and 82 where the current flows in the direction opposite to the direction J and K. For this reason, the jitter compensation is accomplished with an even higher efficiency.

A third embodiment of the signal pickup device, according to the invention, will now be described with reference to FIG. 9. Those parts which are the same as corresponding parts in FIG. 4 are designated by like reference numerals. Description of such parts will be omitted.

This signal pickup device 90 has a cantilever arm 91 which has second permanent magnet member 92 fixed to the extreme proximal end of the cantilever arm 91 at a point which is further remote from the stylus end than the point at which the permanent magnet member 26 is fixed. This second magnet member 92 is so magnetized that its two side wall faces are the N-pole and the S-pole. This magnet member 92 is loosely fitted in a tracking coil 93 which is disposed at a position remotely offset in the Z direction (i.e., away from the stylus) with respect to the coils 33 and 34.

In this pickup device 90, the tracking control is accomplished by imparting a rotation in the β direction to the cantilever arm 91 by the coil 93 and the second permanent magnet member 92. The jitter compensation is carried out in the same manner as in the pickup device hereinbefore described with reference to and as illustrated by FIG. 4.

Next to be described is a fourth embodiment of the signal pickup device, in conjunction with FIG. 10. Those parts which are the same as corresponding parts in FIG. 4 are designated by like reference numerals. A description of such parts will be omitted.

In this signal pickup device 100, a tracking coil 101 is fixed to the front end (i.e., the end toward the stylus) of a shaft 103 of an arm stretcher 102, which is a device of known construction. Coil 101 similar to a voice coil of a loudspeaker is fixed to the main structure of this pickup device 100. Furthermore, the cantilever arm 27, at a part near its proximal end is supported by a damper 104 of a plate shape. Damper 104 limits displacements of the cantilever arm 27 in the arrow directions X and Y. This damper 104 is supported at its two ends and is pushed forward (i.e., toward the stylus 25) by an energization of the coil 101. When pushed, damper 104 is elastically deflected into a curved state (as indicated by solid lines) from its free straight-line state (as indicated by the two-dot chain line).

The tracking control operation of this pickup device 100 is carried out by passing a control current through the tracking coil 101. This current imparts a torque in the β direction to the magnet member 26, as in the preceding embodiments of the invention.

The jitter compensation is accomplished mechanically by operating the arm stretcher 102. More specifically, the damper 104, follows the axial-direction displacement of the coil 101. Due to the operation of the arm stretcher 102, damper 104 is deflected in the restoration direction or the curving direction. The cantilever arm 27 and the reproducing stylus 25 are displaced along the information track direction.

A fifth embodiment of the signal pickup device according to the invention will now be described in conjunction with FIGS. 11 through 14. Those parts which are the same as corresponding parts in FIG. 4 are designated by like reference numerals. Description of such parts will be omitted.

This signal pickup device 110 has a damper 111 which has a yoke-like shape resulting from the combination of two rectangular frames. Damper 111 is fixed to and suspended from the support plate 30. The cantilever arm 27 is supported near its distal end by the damper 28 and is held near its proximal end by passing through a central vertical crosspiece 111a of the damper 111. This central vertical crosspiece 111a is formed with a large width dimension and a small thickness. While it can deflect elastically in the Z direction and can elastically twist, it does not deflect or undergo a displacement in the X and Y directions. Consequently, the cantilever arm 27 can undergo a displacement in only the Z direction and rotation in the α and β directions, about the support near its proximal end.

The permanent magnet member 26 is fixed to the proximal end of the cantilever arm 27. Its front end abuts in the longitudinal direction against the central vertical crosspiece 111a of the damper 111. By this arrangement, the center of gravity of the magnet member 26 is placed very close to the vibration pivotal point of the cantilever arm 27. The moment of inertia of the magnet member 26 becomes very small at the time of cantilever vibration. The follow-up performance relative to disc surface oscillation and the follow-up performance relative to the information track of the reproducing stylus are both improved.

Double-coil structures 112 and 113 of rectangular shape are fixed to the main structure of the pickup device 110. At the time of the mounting of the support plate 30, coils 112, 113 are respectively inserted relatively into openings 111b and 111c in the damper 111, then being positioned on opposite sides of the permanent magnet member 26. Since there is no coil structure surrounding the permanent magnet member 26, the double-coil structures 112 and 113 are disposed at positions which are in very close proximity to the magnetic pole faces of the magnet member 26. The coils are positioned within a range permitting rotational displacement β over a specific angle of the magnet member 26. By this arrangement, the straight displacement force becomes amply large in the arrow direction Z, the force acting on the magnet member 26, particularly at the time of jitter compensation.

Figure 12:
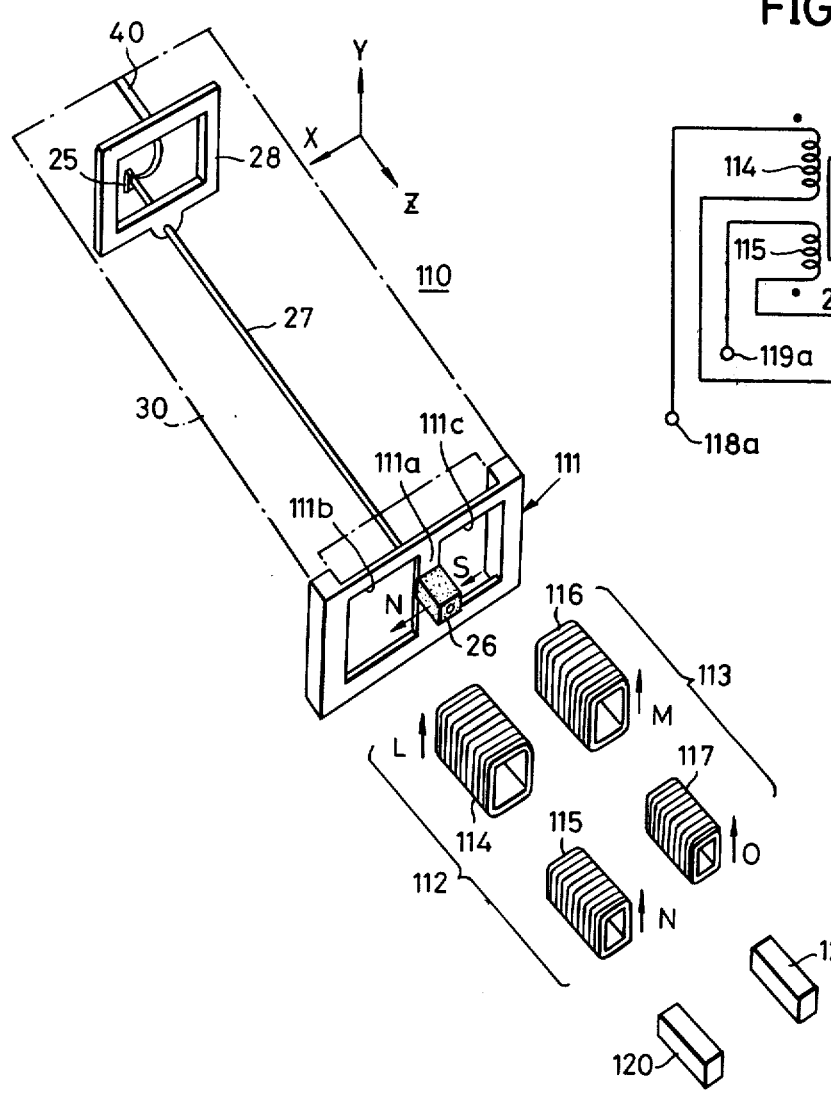
FIG. 12 is an exploded perspective view of the device illustrated in FIG. 11.

One double-coil structure 112, as shown in FIG. 12, comprises an outer coil 114 for jitter compensation and an inner coil 115 for tracking control, the inner coil being fitted within the outer coil 114. The other double-coil structure 113 is similar and comprises an outer coil 116 for jitter compensation and an inner coil 117 for tracking control, the inner coil being fitted within the outer coil 116.

Figure 13:
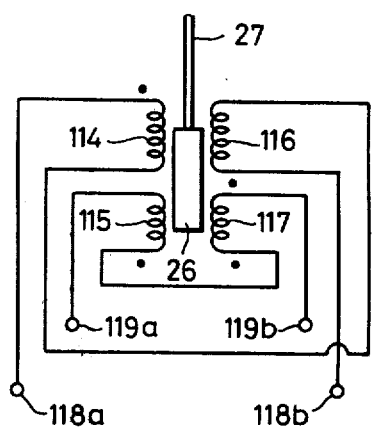
FIG. 13 is a schematic electrical circuit diagram of the cantilever driving means used in the device shown in FIG. 11.

The two outer coils 114 and 116 are connected in series with each other for jitter compensation. Then, they are connected to terminals 118a and 118b as shown in FIG. 13. When a voltage is applied across the terminals 118a and 118b, current flows in opposite directions through these coils 114 and 116 respectively in the arrow directions L and M. The two inner tracking coils 115 and 117 are connected in series with each other and to terminals 119a and 119b as shown in FIG. 13. When a voltage is applied across the terminals 119a and 119b, current flows in the same direction through these coils 115 and 117 respectively in the arrow directions N and O.

Figure 14:
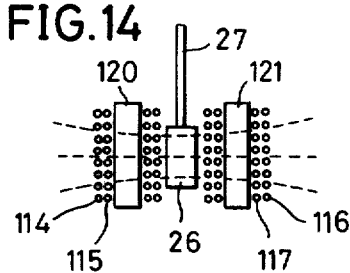
FIG. 14 is a schematic diagram indicating lines of magnetic flux in the cantilever driving means.

Furthermore, the interiors of these double-coil structures 112 and 113 respectively accommodate ferromagnetic bars 120 and 121, inserted therein as coil cores. In this case, these ferromagnetic bars 120 and 121 are disposed in close proximity to the permanent magnet member 26. Almost all of the lines of magnetic force produced around the magnet member 26 pass through the double-coil structures 112 and 113, as indicated in FIG. 14. By this arrangement, the tracking control and the jitter compensation described hereinafter are accomplished with high gain.

During signal reproduction, tracking error occurs, and a control current is produced responsive thereto, as an output from the tracking servo circuit in the apparatus illustrated in FIG. 5. This control current flows between terminals 119a and 119b of the pickup device and through the two tracking coils 115 and 117, in the arrow directions N and O, or in the directions opposite thereto. Consequently, a torque is produced in the β direction, about an imaginary vertical axis passing through the center of gravity of the magnet member 26. This torque is a result of the interaction of the magnetic flux and the electromagnetic producing current. This torque caused the cantilever arm 27 to swing in the β direction about its point of support by the damper 111, accompanied by a deflection of the damper 28. The reproducing stylus 25 is displaced in the arrow direction X. Tracking control is thus accomplished.

Figure 6:
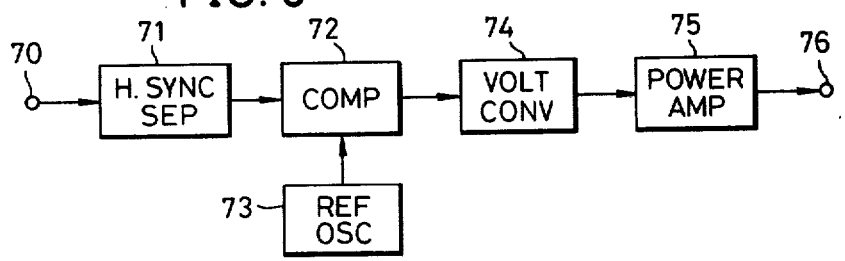
FIG. 6 is a block diagram of one example of a jitter compensation circuit.

When jitter is produced during signal reproduction, jitter is produced a control signal current from the output terminal 76 of the circuit shown in FIG. 6 flows between the above mentioned terminals 118a and 118b and flows through the two coils jitter compensation 114 and 116 in the arrow directions L and M, or in directions opposite thereto. As a result, a displacing force, in the arrow direction Z, is generated in the permanet magnet member 26, as in the preceding cases. The reproducing stylus 25 undergoes a displacement in the track direction, whereby jitter compensation is achieved.

Figure 15:
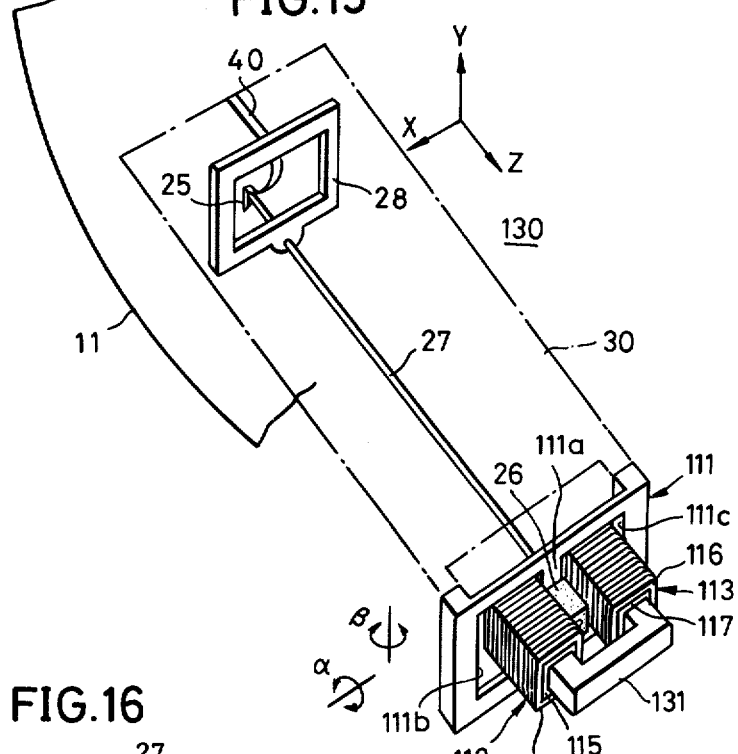
FIG. 15 is a general perspective view of a sixth embodiment of the signal pickup device of the invention.
Figure 16:
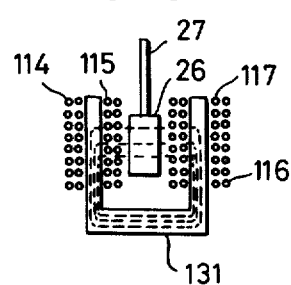
FIG. 16 is a schematic diagram indicating the magnetic flux lines at the cantilever driving means in the device shown in FIG. 15.

Next, a sixth embodiment of the signal pickup device of the invention will be described with reference to FIGS. 15 and 16. Those parts which are the same as corresponding parts in FIGS. 11 through 14 are designated by like reference numerals. Description of such parts will be omitted.

This signal pickup device 130 has a construction which is substantially the same as that of the signal pickup device 110 illustrated in FIG. 11. In place of the pair of ferromagnetic bars 120 and 121, a U-shaped yoke 131 is used. By the use of this yoke 131, the magnet member 26 and this yoke 131 form a magnetically closed circuit. As indicated in FIG. 16, magnetic flux of high density (or magnetic induction) intersects only the windings on the double-coil structures 112 and 113, on their sides facing the magnet member 26.

Consequently, there are displacing forces in the Z direction and the torque in the β direction. These forces are generated as reaction forces in the permanent magnet member 26, as a result of the control currents responsive to jitter error and tracking error. These currents are applied to the double-coil structures 112 and 113 to produce even greater reaction forces. Jitter compensation and tracking control are carried out with high gain and with high efficiency.

A seventh embodiment of the signal pickup device of the invention will now be described in conjunction with FIG. 17. Those parts which are the same as corresponding parts in FIGS. 11 and 15 are designated by like reference numerals.

In this signal pickup device 135, in place of the double-coil structures 112 and 113 of the signal pickup device 110, illustrated in FIG. 11, coil structures 136 and 137 are each formed by winding into rectangular shape two lengths of conductor wire. Into these coil structures 136 and 137, respective arms of the yoke 131 are inserted. Each of these coil structures 136 and 137 comprises two coils formed independently of each other for jitter compensation and tracking control. Thus these coil structures 136 and 137 have the same functions as the double-coil structures 112 and 113 in the signal pickup device shown in FIG. 11.

FIG. 18 illustrates an eighth embodiment of the signal pickup device of the invention. In FIG. 18, those parts which are the same as corresponding parts in FIGS. 11 and 15 are designated by like reference numerals.

In this signal pickup device 140, coils 141 and 142 are formed by winding into rectangular shapes a single conductor wire. Coils 141, 142 are used in place of the double-coil structures 112 and 113 in the signal pickup device 110 illustrated in FIG. 11. These coils 141 and 142 are not connected to each other, and each coil has a pair of terminals. When a first current is passed through these coils 141 and 142 in mutually the same direction, a torque in the β direction is generated in the permanent magnet member 26. On the other hand, when a second current is passed through these coils 141 and 142 in mutually opposite directions, a displacing force in the arrow direction Z is generated in the magnet member 26.

In this case, first current is formed on the basis of the tracking error signal and the second current on the basis of an error correction signal for the relative speed of the disc and the reproducing stylus. When adding the two currents by passing them through a suitable circuit, and applying the added currents to the coils 141 and 142, jitter compensation and tracking control can be carried out with high gain.

The fifth and eighth embodiments of the invention may also use a construction wherein the permanent magnet member is held at its center of gravity position by the central vertical crosspiece 111a of the damper 111. By this arrangement the pivot point of the swinging motion of the cantilever arm 27 is made to coincide with the center of gravity of the magnet member 26. The tracking control operation can be carried out with further accuracy.

Furthermore, instead of the above described damper 111, a damper having the shape of the character "S", "H", or "X", or of the numeral "8" can be used.

Further, this invention is not limited to these embodiments. Variations and modifications may be made without departing from the scope of the invention.

What is claimed is:

1. A signal pickup device for use in an apparatus for reproducing an information signal recorded in a track on a horizontal surface of a grooveless rotary recording medium, said signal pickup device comprising:

a reproducing stylus means for tracing the track on the rotary recording medium, thereby reproducing an information signal recorded in the track;

means including a cantilever arm supported by damper means so as to be rotatable about substantially the proximal end and movable in an axial direction, and having said reproducing stylus at a free distal end thereof;

means comprising a permanent magnet fixed to the proximal end of said cantilever arm and having magnetic poles on the opposite lateral faces thereof, said poles extending in the axial direction of said cantilever arm means, movement of said magnet causing said cantilever to move said reproducing stylus;

a tracking control coil means secured to a support structure of said pickup device with a pair of winding surface portions extending in substantially a vertical direction to confront the poles of said permanent magnet; and means for generating a tracking control signal current in response to a tracking error, said signal current being supplied to said tracking control coil means, the tracking control signal current fed to said tracking coil means flowing through said pair of vertical winding surface portions in opposite directions with respect to each other, the electromagnetic field resulting from the energization of said coil causing said permanent magnet to rotate about a vertical axis for rotating said cantilever arm means, due to a mutual reaction between the electromagnetic field and the tracking control signal current, whereby the reproducing stylus is displaced so as to trace a track with the tracking error controlled.

2. A signal pickup device as claimed in claim 1 in which said tracking control coil means comprises a single coil secured to the support structure and surrounding said permanent magnet member with the axial direction of the winding coinciding with the axial direction of said cantilever arm.

3. A signal pickup device as claimed in claim 1 in which said tracking control coil means comprises a pair of coils secured to the support structure and confronting the opposite lateral faces of said permanent magnet member with the axial direction of the winding coinciding with the axial direction of said cantilever arm, and said tracking control signal current flowing through said coils in the opposite directions with respect to each other.

4. A signal pickup device as claimed in claim 1 in which said reproducing apparatus further comprises jitter compensation means for detecting a jitter component in a signal picked up by said signal pickup device and for generating a jitter compensation signal current responsive thereto, said jitter compensating means further comprising jitter compensation coil means having a pair of coils secured to the support structure with a pair of winding surface portions extending in a substantially vertical direction to confront opposite lateral faces of said permanent magnet, with the axis of the winding coinciding with the axial direction of said cantilever arm, means for energizing the pair of coils with the jitter compensation signal current, said current flowing in the same direction through vertical portions confronting said permanent magnet, which causes said permanent magnet member to displace in the axial direction responsive to a mutual reaction between the permanent magnet and the magnetic field of said coils responsive to their energization by the jitter compensation signal current, whereby the reproducing stylus is displaced through said cantilever in the longitudinal direction of the track and the jitter component is compensated.

5. A signal pickup device as claimed in claim 4 in which said tracking control coil means and said jitter compensation coil means comprise coils in which the cross section taken along a surface perpendicular to the winding axis is of rectangular shape, and said magnet is a rectangular parallelpiped.

6. A signal pickup device as claimed in claim 4 in which said jitter compensation coil means comprises a pair of substantially flat coils secured to the support structure, said coils being positioned flat and in a surface perpendicular to said rotary recording medium, said surface extending in the longitudinal direction of the track to cause a one branch part in which the coil wire extends vertically to confront the opposite magnetic pole faces of said permanent magnet.

7. A signal pickup device as claimed in claim 5 which further comprises a yoke means accommodated into said coils wound in a rectangular shape.

8. A signal pickup device as claimed in claim 5 which further comprises ferromagnetic bar means accommodated into said coils wound in a rectangular shape.

9. A signal pickup device as claimed in claim 4 in which said permanent magnet comprises a first permanent magnet for applying a magnetic field to said tracking control coil means, and a second permanent magnet for applying another magnetic field to said jitter compensation coil means.

10. A signal pickup device as claimed in claim 1 in which the damper means for supporting said cantilever arm comprises a first damper means having a rectangular frame-shape for holding the distal end of said cantilever arm at a center of a lower beam thereof and a second damper means of a triangular frame-shape for holding the proximal end of said cantilever arm, said first damper deforming to enable displacement of said cantilever in its axial direction and any directions perpendicular to the axial direction, and said second damper deforming to allow displacement of said cantilever in only the axial direction thereof and limiting displacement of said cantilever in directions perpendicular to the axial direction thereof.

* * * * *